United States Patent [19]

Bross

[11] Patent Number: 4,592,471
[45] Date of Patent: Jun. 3, 1986

[54] BAKEWARE ORGANIZER

[75] Inventor: Elly Bross, Montreal, Canada

[73] Assignee: Stanbel, Inc., Montreal, Canada

[21] Appl. No.: 719,206

[22] Filed: Apr. 2, 1985

[51] Int. Cl.$^4$ ................................................ A47F 7/00
[52] U.S. Cl. ........................................ 211/41; 108/61;
211/43; 211/184; D32/56
[58] Field of Search ...................... 211/43, 184, 41, 71,
211/11; 108/61; D32/56

[56] References Cited

U.S. PATENT DOCUMENTS

| 1,772,438 | 8/1930 | Cubberley | 211/43 X |
| 2,684,765 | 7/1954 | Lowenstein | 211/43 |
| 3,120,894 | 2/1964 | Conley | 211/43 |
| 3,138,262 | 6/1964 | Anders | 211/43 |
| 3,142,384 | 7/1964 | Fridolph | 211/43 |
| 3,487,945 | 1/1970 | Barham | 211/43 |
| 4,476,985 | 10/1984 | Norberg et al. | 211/184 X |
| 4,512,480 | 4/1985 | Evenson | 211/184 X |

FOREIGN PATENT DOCUMENTS 0012783 7/1980 European Pat. Off. .............. 211/41

Primary Examiner—Robert W. Gibson, Jr.
Attorney, Agent, or Firm—Hill, Van Santen, Steadman & Simpson

[57] ABSTRACT

An adjustable storage rack is provided which includes a base member securable to a supporting surface by screws which has a longitudinal channel in an upper surface to slidingly receive vertical support members. Any number of support members can be used to customize the storage space of the rack so that it can hold bakeware and other items in a vertical manner. The support members are held in the channel by opposed flanges above a bottom surface of the channel and when items are placed on the rack, the support members, being resilient, bend slightly, thus locking the supports in selected positions. Grooves are formed on an upper surface of the base members, perpendicular to the channel, to prevent the stored items from slipping along the upper surface.

10 Claims, 7 Drawing Figures 4,592,471

BAKEWARE ORGANIZER

BACKGROUND OF THE INVENTION

1. Field of the Invention

The present invention relates to kitchen storage racks and more particularly to adjustable racks for storing bakeware or dishes.

2. Description of the Prior Art

Racks for storing bakeware, dishes and other kitchen items are known in the art in which the bakeware or dishes are stored in a vertical arrangement as opposed to being stacked horizontally. An advantage to storing vertically is that each of the items is available for immediate access rather than requiring removal of all items and replacement of those items not selected.

Previously known storage racks have vertical support members positioned in fixed locations for providing the vertical support for the bakeware and plates. The racks are generally placed on the shelves or in cupboards without any means provided to secure the rack in any one position. Further, known storage racks are bulky and require a large amount of space during storage, shipping and selling.

SUMMARY OF THE INVENTION

The present invention provides for a bakeware organizer rack which has a base member securable to a shelf, cupboard or other location and which has a plurality of adjustable vertical support members. Because bakeware comes in a variety of shapes and depths, the organizer rack of the present invention permits the user to customize the rack to the exact configuration of the items being stored to maximize the usable area of the rack.

The base member has a central longitudinal groove which has a pair of inwardly extending flanges along the top portion defining a top opening smaller than the width of the groove or channel which receives a foot portion of the vertical support members. The support members have an arm member extending up from the foot portion through the opening between the flanges and the channel to extend above an upper surface of the base member to provide the support for the bakeware items. The foot portion is slidable along the length of the channel thus permitting selective adjustment of the position of the support members relative to the base member. The support members are fabricated of a resilient material such as polystyrene and, when bakeware or other items are leaned against the support members, they tend to flex and bend, thus slightly tilting the foot portion in the channel to effectively lock the foot in the selected position by a wedging action. The upper surface of the base member is provided with lateral grooves perpendicular to the channel which receive a lip portion of the bakeware items to prevent those items from slipping while being held in the rack.

The vertical support members are removable from the base member, thus permitting them to lie flat during storage, shipping and selling which greatly compacts the rack and reduces the packaging cost and shelf space necessary for sale of the items. Since the vertical support members are removable from the base, cleaning the storage rack is also much easier.

DESCRIPTION OF THE PREFERRED EMBODIMENTS

Figure 1:
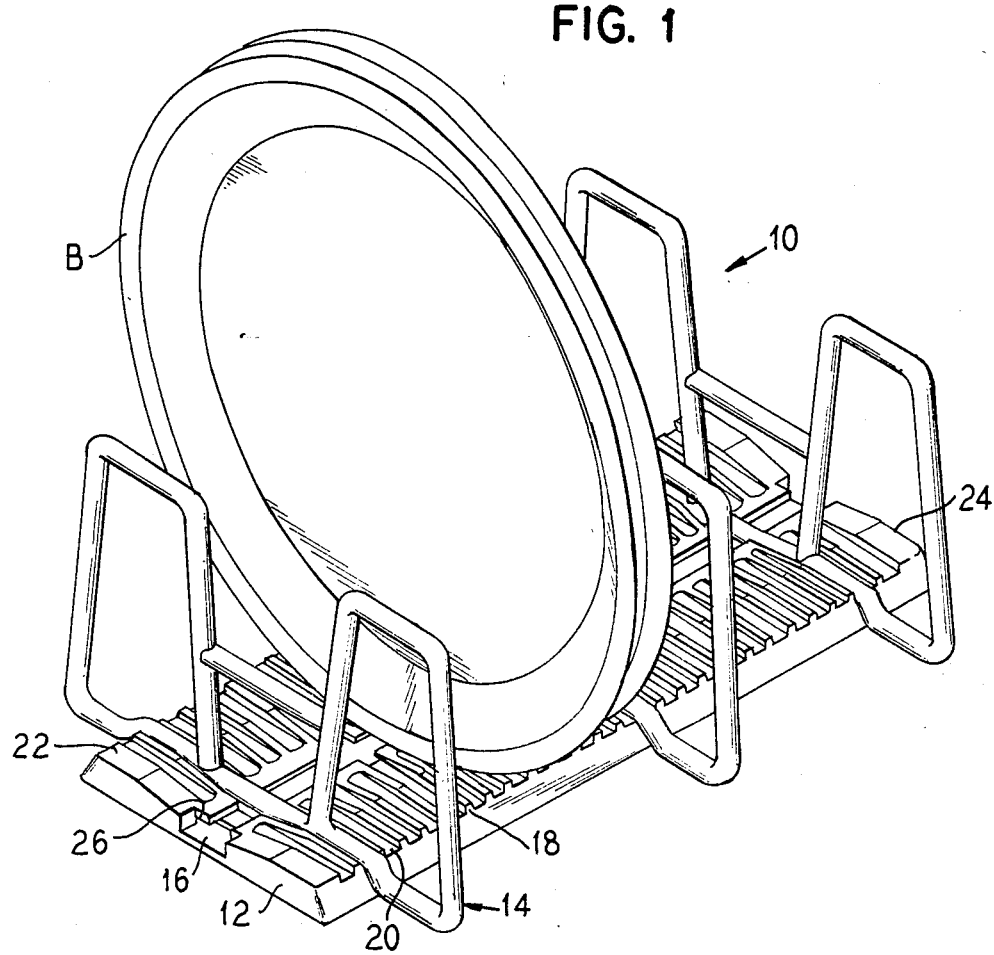
FIG. 1 is a perspective view of a bakeware organizer emboding the principles of the present invention.

In FIG. 1 there is shown a bakeware organizer rack generally at 10 which is comprised of a base member 12 and a plurality of vertical separators or support members 14 which are used to support bakeware items B in a vertical manner.

Figure 2:
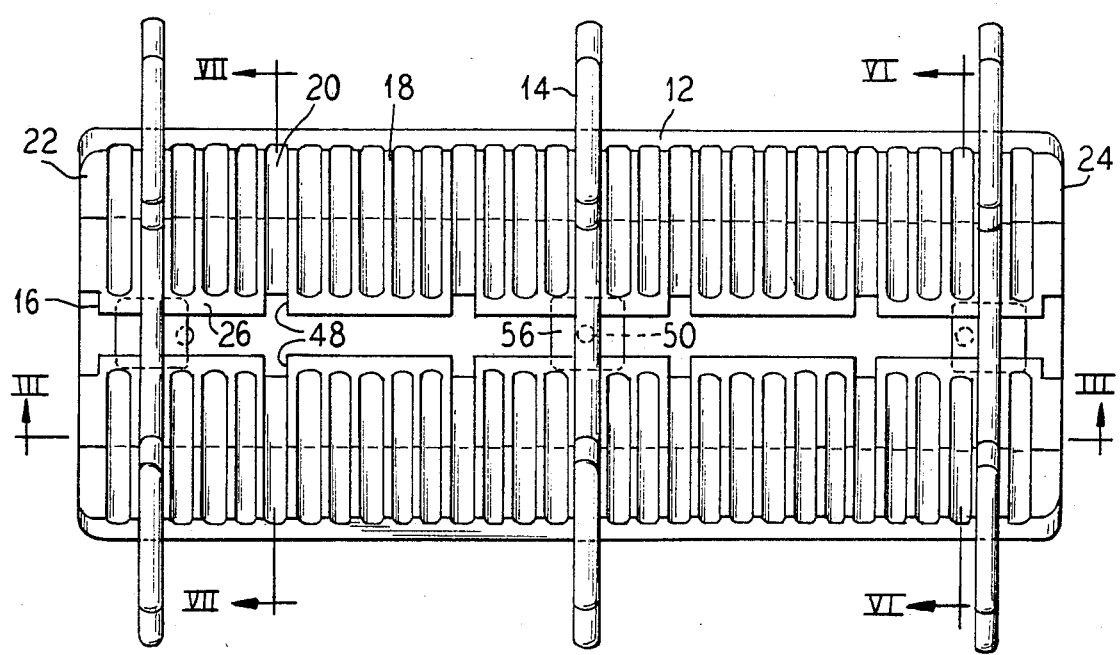
FIG. 2 is a planned view of the rack of FIG. 1.

As seen in FIGS. 1 and 2, the base member 12 has a rectangular shape with a central longitudinal channel 16 running the entire length of the base member 12 and a plurality of laterally extending ribs or ridges 18 on either side of the channel 16 formed by spaced grooves 20. The grooves 20 are spaced from a first longitudinal end 22 of the base member 12 to a second longitudinal end 24. The end profile and cross-section of the base member 12 show that the ribs 18 form a top surface of the base member which is spaced above a bottom edge 32 by side walls 34. The grooves 20 are formed in the top surface, thus forming the adjacent ribs 18.

Figure 5:
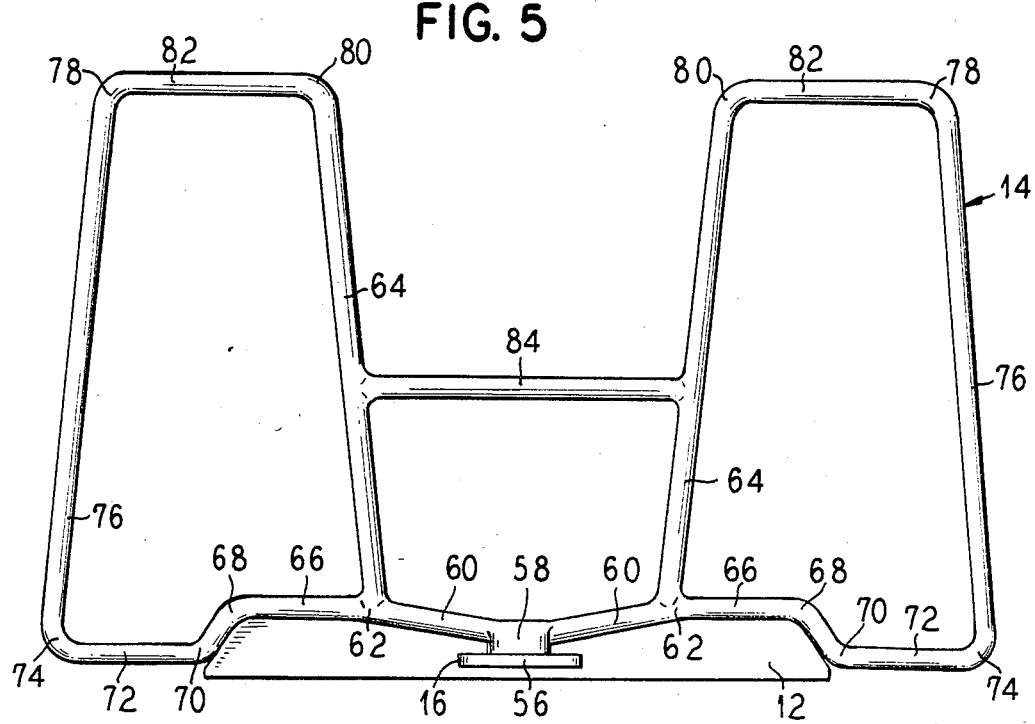
FIG. 5 is an end view of the rack.
Figure 6:
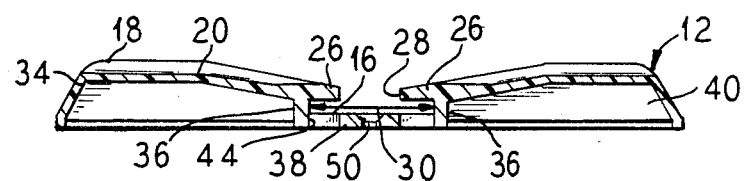
FIG. 6 is a sectional view of the base member taken generally along the lines VI—VI of FIG. 2.
Figure 7:
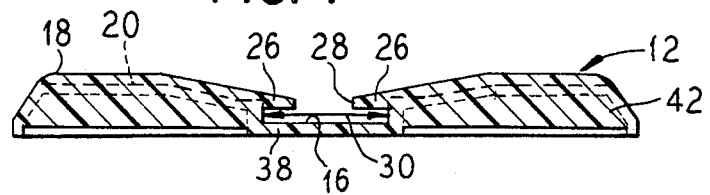
FIG. 7 is a sectional view of the base member taken generally along the lines VII—VII of FIG. 2.

As shown in FIGS. 5, 6 and 7, the longitudinal channel 16 has a pair of horizontal flanges or lips 26 extending inwardly along a top edge of a pair of side walls 27 of the channel 16 such that a top opening 28 of the channel 16 is narrower than a width 30 of the channel.

The flanges 26 are extensions of the top surface and are spaced above a central bottom wall 38. A space 40 between the top wall 18 and the bottom edge 32 of the base member 12 is generally open as seen in FIG. 6, however, there are provided four ribs 42, seen in FIGS. 7 and 4 which extend between the outer side walls 34 and the side walls 27 to provide stability and support for the base member 12.

A plurality of longitudinally oriented slots 44 extend along the axial length of the base member 12 and are spaced one from another by lands 46 which connect the central bottom wall 38 to the side walls 27. The slots 44 extend approximately the width of the flanges 26 and provide access for the mold during the fabrication process. It is contemplated that the base member 12 be molded of the material such as high impact polystyrene thus, provision of the slots 44 permits formation of the flanges 26. As seen in FIG. 2, the flanges 26 have spaced gaps 48 therebetween which overlie the lands 46 in the bottom wall 38. Again, this is primarily for molding purposes.

Figure 4:
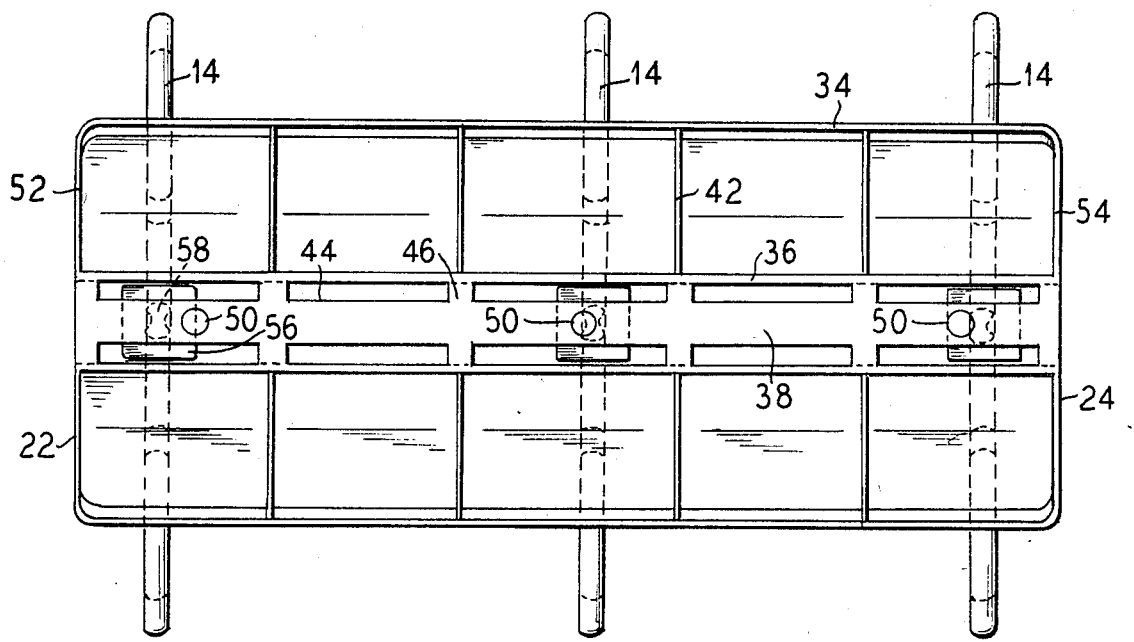
FIG. 4 is a bottom elevational view of the rack.

As seen in FIGS. 6 and 4, there are provided a plurality of screw receiving holes 50 spaced along the length of the bottom wall 38 to permit the base member 12 to be securely fastened to a shelf or cabinet floor. The longitudinal ends 22, 24 of the base member 12 are each provided with an end wall 52, 54 respectively so that the ends of the base member are enclosed.

The support members 14 are best shown in FIG. 5 where it is seen that there is provided a foot portion 56 located at the bottom of the support member at the central portion of the support. A short vertical arm 58 extends above the foot 56 and connected to it are a pair of laterally extending arms 60. The arms 60 are sloped slightly upwardly as they move away from the central vertical arm 58 to a point 62 which comprises a junction with a vertical arm 64. The lateral arms 60 proceed further away from the central arm 58 along a substantially horizontal portion 66 to a first bend 68 where the arm 60 proceeds downwardly and outwardly to a second bend 70 where the arm proceeds outwardly at a second substantially horizontal portion 72 to a junction 74 with an outer vertical arm 76. The outer vertical arm 76 and inner vertical arms 64 proceed upwardly to junctions 78, 80 respectively with a top horizontal arm 82 which connects the inner and outer vertical arms. A central vertical arm 84 connects the spaced inner vertical arms 64. In this manner, stability is added to the arms.

Figure 3:
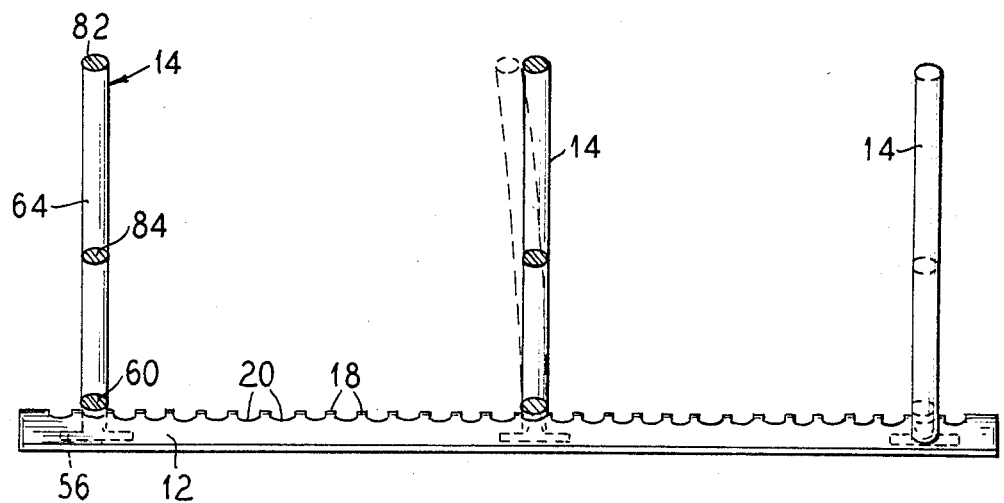
FIG. 3 is a side sectional view taken generally along the lines III—III of FIG. 2.

As seen in FIG. 5, the foot portion 56 extends laterally from the central vertical arm 58 and is received in the channel 16 beneath the flanges 26. The central vertical arm 58 extends upwardly through the opening 28 forming the top of the channel 16. The foot portion 56 has a generally square bottom surface configuration as seen in FIGS. 2 and 4. The height of the foot portion 56 is slightly less than the gap between the bottom wall 38 and the flanges 26 so that the foot portion 56 can freely slide within the channel 16. The lateral arms 60 conform generally to the configuration of the top wall of the base member 12. Because the height of the foot portion 56 is slightly less than the gap in the channel, the vertical support will tilt slightly from vertical as seen in phantom in FIG. 3, effectively locking the support member in the selected longitudinal position.

This tilting of the support members 14 is enhanced by the placement of items in the rack in that the vertical arms are resilient and bend slightly when supporting the items. The tilting of the support members causes the foot portion 56 to tilt slightly in the channel 16 effectively locking the foot portion in the channel and preventing its further movement until it is righted and pushed longitudinally in the channel. As the support member is pushed along the channel, the lateral arms 60 slightly clear the tops of the ribs 18 to permit a free sliding movement, but when the support members are slightly tilted in the channel, and especially when slightly bent by items in the rack, the horizontal arms move below the level of the ribs and are received in the lateral grooves 20 in the top surface of the base member 12 to further lock the support member in place.

The grooves 20 in the top of the base member 12 also assist in holding the bakeware items vertically in that they are prevented from sliding while held between vertical supports, even when adjacent bakeware items are removed for use. Thus, replacement of bakeware items to the rack is facilitated in that the bakeware items previously left in the rack would have remained in their original places, thus leaving the original space for the item being returned.

Since bakeware and dishes come in various depths, the vertical supports 14 can be moved longitudinally relative to the base member 12 to customize the rack 10 for a particular user's cooking dishes. In this manner, spaces between adjacent bakeware items can be closed up or expanded thereby resulting in a more efficient use of the space occupied by the rack 10.

The ends of the channel 16 are open to permit vertical supports 14 to be completely removable from the channel 16 for cleaning or storage by the user thus resulting in a more compact storage arrangement than if the vertical supports were rigidly held in place. Also, the cleaning of the individual parts is easier than if the supports were rigidly held in place.

The removability of the supports from the base member is also helpful in shipping, storing and selling by the manufacturer and the distributors in that the disassembled volume occupied by the storage rack is much less than if the vertical supports were rigidly held on the base member.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. An adjustable storage rack comprising:
   an elongated rectangular base member having an upper surface with a central longitudinal channel and a plurality of spaced lateral grooves formed therein,
     said longitudinal channel having an open end and a constant width extending the entire length of said base member and having a pair of flanges extending inwardly along the length of said channel defining a top opening of said channel narrower than said channel width,
     said lateral grooves extending the entire width of said base member and defining ridges therebetween,
     said channel having a bottom wall spaced below said flanges,
   at least one vertical support member,
     said support member having a foot portion receivable in said open end of said channel, cpatured by said flanges and free to slide the length of said channel,
     said support member having a central vertical arm extending upwardly from said foot portion and dimensioned to pass through said top opening in said channel,
     said support member having a pair of opposed lateral arms extending from said central vertical arm,
     said support member having at least one vertical arm extending upwardly from said lateral arms,
     said support member being selectively slidable along the length of said member and being slightly tiltable in said channel such that said foot portion is frictionally lockable against said flanges and said bottom wall,
     said lateral arms being spaced slightly above said ridges when said support member is held in a vertical orientation, and when said support member is tilted in said channel, said lateral arms moving below the level of said ridges and being received in said lateral grooves to further lock said support member in place,
   whereby said supports can be secured in selected places relative to said base member to vertically support bakeware and other items held in said rack.

2. A storage rack according to claim 1 wherein said base member includes means for securing said base member to a supporting surface.

3. A storage rack according to claim 1 wherein said foot portion extends horizontally in the form of a rectangular pad and lateral portions of said foot portion are captured by said flanges.

4. A storage rack according to claim 1 wherein said lateral arms extend from said central vertical arm overlying the entire width of said base member and generally conform to the contour of said upper surface.

5. A storage rack according to claim 1 wherein said vertical support member includes four vertical arms extending upwardly from said lateral arms and adjacent vertical arms being connected by horizontal arms positioned above said lateral arms.

6. A storage rack according to claim 2 wherein said means for securing said base member to a supporting surface includes openings through said base member for receiving fastening members.

7. A storage rack according to claim 6 wherein said openings through said base member are formed to extend through said bottom wall of said channel.

8. An adjustable storage rack comprising:
an elongated rectangular base member having an upper surface with a central longitudinal channel and a plurality of spaced lateral grooves formed therein,
said longitudinal channel having a constant width extending the entire length of said base member, having a pair of flanges extending inwardly along the length of said channel defining a top opening of said channel narrower than said channel width and being open at each end of said base member,
said lateral grooves extending the entire width of said base member and defining ridges therebetween,
said channel having a bottom wall spaced below said flanges,
said base member including openings therethrough for receiving fastening members such that said base member can be secured to a supporting surface,
at least one vertical support member,
said support member having a horizontally extending foot portion in the form of a rectangular pad receivable in said open ends of said channel with lateral portions captured by said flanges and being free to slide the length of said channel,
said support member having a central vertical arm extending upwardly from said foot portion and dimensioned to pass through said top opening in said channel,
said support member having a pair of opposed lateral arms extending from said central vertical arm overlying the entire width of said base member and generally conforming to the contour of said upper surface,
said support member having at least one vertical arm extending upwardly from said lateral arms,
said support member being selectively slidable along the length of said member in a vertical orientation and being slightly tiltable in said channel such that said foot portion is frictionally lockable against said flanges and said bottom wall,
said lateral arms being spaced slightly above said ridges when said support member is held in a vertical orientation and when said support member is tilted in said channel, said lateral arms moving below the level of said ridges and being received in said lateral grooves to further lock said support member in place,
whereby said supports can be secured in selected places relative to said base member to vertically support bakeware and other items held in said rack.

9. A storage rack according to claim 8, wherein said vertical support member includes four vertical arms extending upwardly from said lateral arms and adjacent vertical arms being connected by horizontal arms above said lateral arms.

10. A storage rack according to claim 8 wherein said openings through said base member for receiving fastening members are positioned in said bottom wall of said channel.

* * * * *